United States Patent [19]
Pitolaj

[11] Patent Number: 4,913,951
[45] Date of Patent: Apr. 3, 1990

[54] FABRICATION OF REINFORCED PTFE GASKETING MATERIAL

[75] Inventor: Stefan Pitolaj, Palmyra, N.Y.

[73] Assignee: Garlock Inc., Palmyra, N.Y.

[21] Appl. No.: 224,393

[22] Filed: Jul. 26, 1988

[51] Int. Cl.[4] .......................... B32B 1/04; C09J 5/00
[52] U.S. Cl. ....................................... 428/76; 156/87;
    156/252; 156/264; 156/309.6; 156/311;
    156/312; 156/323; 277/235 R; 428/140
[58] Field of Search ................. 156/87, 252, 264, 323,
    156/309.6, 312, 311; 277/235 R; 428/76, 140

[56] References Cited

U.S. PATENT DOCUMENTS

| | | |
|---|---|---|
| 2,976,093 | 3/1958 | Reiling . |
| 3,304,221 | 2/1967 | Eggleton . |
| 3,421,972 | 1/1969 | Cromwell et al. . |
| 4,103,913 | 8/1978 | McDowell . |
| 4,670,089 | 6/1987 | Hanson . |

*Primary Examiner*—John J. Gallagher
*Attorney, Agent, or Firm*—Sixbey, Friedman, Leedom & Ferguson

[57] ABSTRACT

A reinforced composite gasketing material characterized by high strength and dimensional stability, excellent recovery and superior creep relaxation resistance properties and a process for producing such a gasketing material are provided. The composite gasketing material of the present invention is a multiple layer laminate of filled polytetrafluoroethylene (PTFE) and at least one ply of perforated stainless steel. The process of the present invention includes the steps of pressure sintering alternately layered sheets of a PTFE/filler blend and stainless steel by the application of a sequence of intervals of pressures and temperatures selected primarily according to the thickness desired in the finished material and then rapidly cooling the sintered composite under pressure. The resulting gasketing material has the metal layer completely encapsulated by and bonded to the PTFE/filler material. The process of the present invention can be used with equal facility to produce gasketing material in sheet form from which individual gaskets can be cut or in the form of individually molded gaskets. One embodiment of the present invention provides a gasketing material characterized by high compressibility particularly suitable for use in glass-lined pipes.

20 Claims, 7 Drawing Sheets

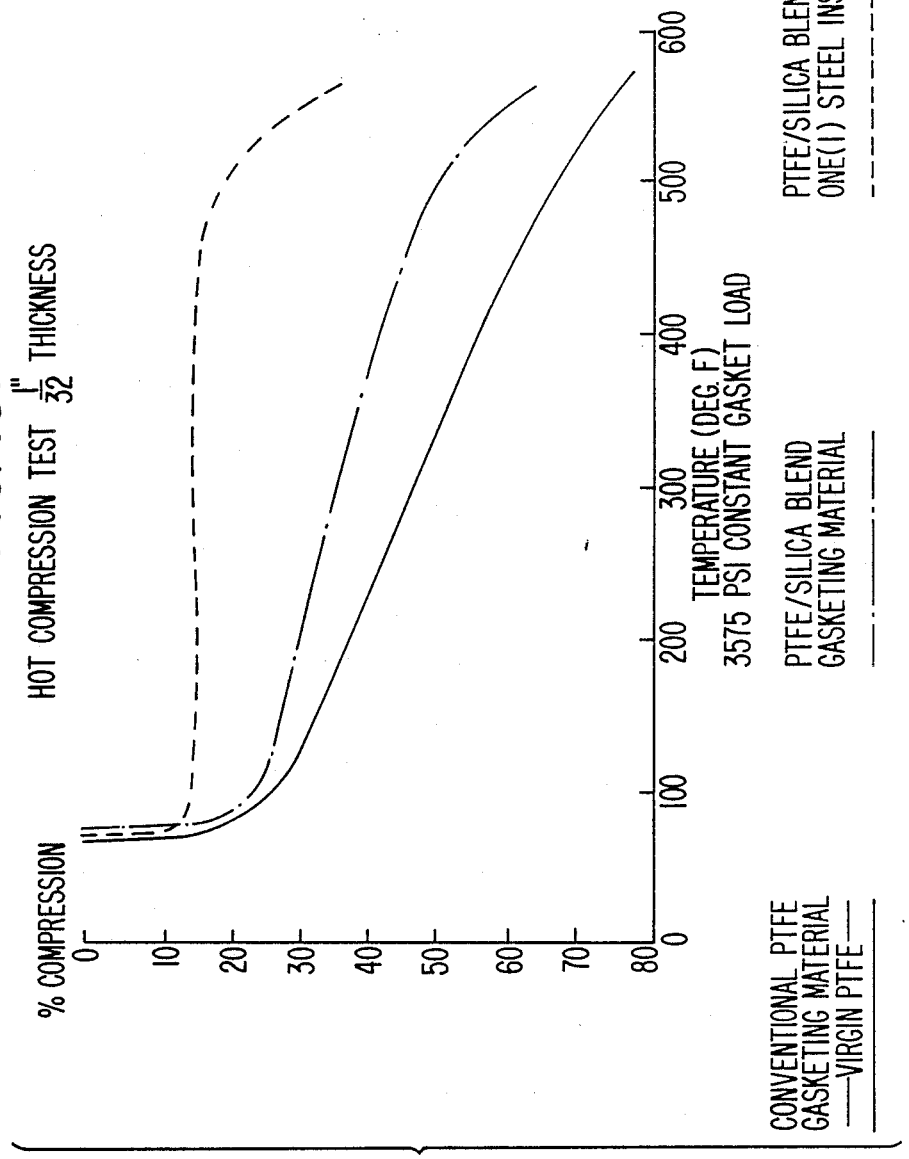

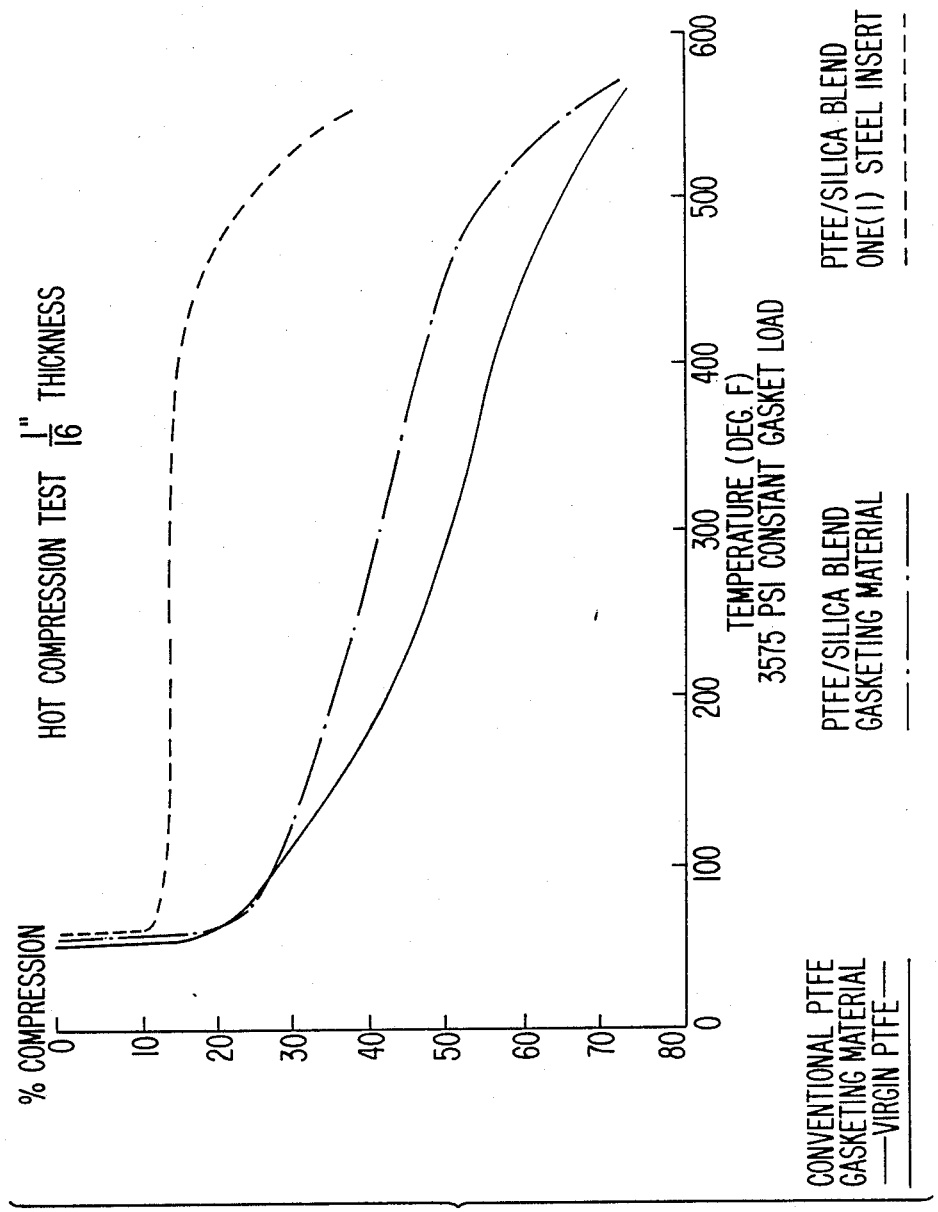

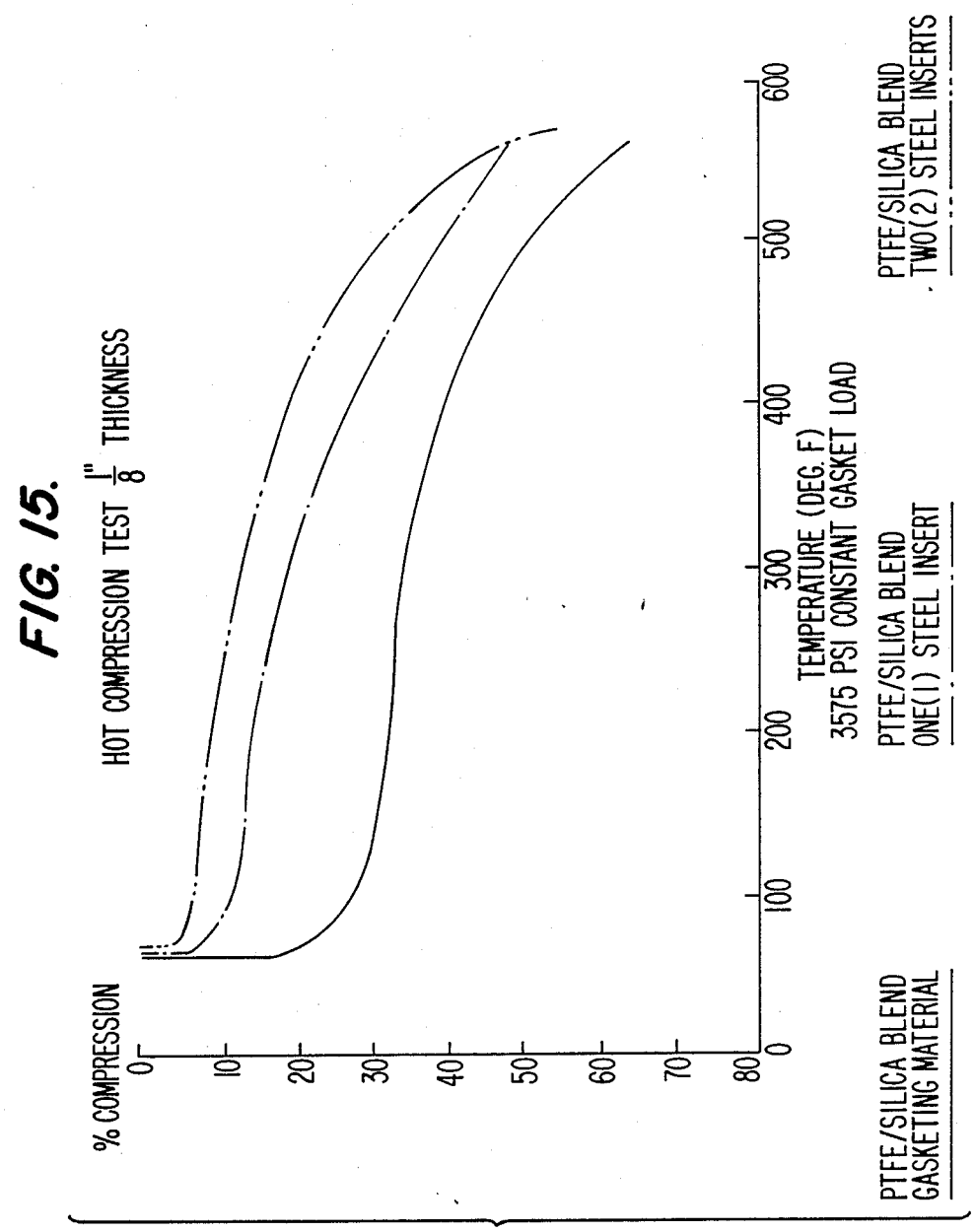

FABRICATION OF REINFORCED PTFE GASKETING MATERIAL

TECHNICAL FIELD

The present invention relates generally to reinforced gasketing materials and specifically to a filled polytetrafluoroethylene stainless steel reinforced gasketing material and a process whereby such a material can be produced.

BACKGROUND ART

Many contemporary gasket applications require a gasket made from a material that is resilient yet highly resistant to corrosive chemicals and that also maintains a high tensile strength and dimensional stability at elevated temperatures and pressures. Conventional polytetrafluoroethylene (PTFE) gasketing materials have the necessary corrosion resistance, but have proven unsatisfactory in many applications because of high creep relaxation and cold flow problems that are inherent with pure PTFE. After a relatively short period of use gaskets made from conventional PTFE products are unable to withstand high bolt loads and temperatures and, as a result, lose thickness due to creep relaxation. Because the gasket no longer fills the space it once did, fluid is able to leak from the gasketed joint. The filled PTFE gasketing materials currently available outperform conventional PTFE products in most applications. However, at elevated temperatures and pressures even filled PTFE gasketing materials lack the tensile strength and dimensional stability required to avoid premature gasket failure.

An acceptable gasket for gasket applications that subject the gasketing material to prolonged periods of high temperatures and pressures without failure has not heretofore been available. An example of such an application is the batch digester commonly employed in the processing equipment used by the pulp and paper industry. This apparatus is susceptible to a problem known as uncontrolled hammering which usually occurs in a check valve and flanged joints of the batch digester. Uncontrolled hammering leads to the extrusion of filled PTFE gasketing materials from the joint and results in undesirable fluid leakage. Other applications in which gaskets are subjected to prolonged intervals of elevated temperatures and pressures are also plagued by premature gasket failure resulting from extrusion of the gasket from the joint and the subsequent loss of sealing capability.

It has been proposed to laminate PTFE to various materials, primarily metals, to enhance the effectiveness of gaskets formed from these materials. PTFE, however, does not readily adhere to metal by itself. Consequently, measures must be taken to insure that the PTFE will adhere to the metal. Hanson U.S. Pat. No. 4,670,089 is exemplary of one method of achieving adhesion between a PTFE film and a metal. This method is rather involved and requires several steps, including etching of PTFE film, separately treating a film containing a thermosetting adhesive to make it tacky, joining this film to the PTFE film, joining both films to the metal and heating the laminate thus formed while restraining the laminate from lateral expansion.

PTFE has also been bonded to metal by an adhesive material to form a composite useful as a gasketing material with improved dimensional stability. U.S. Pat. No. 4,103,913, for example, discloses a multilayer engine head gasket which resists scoring, scratching and fretting corrosion and maintains the desired shape. This laminated gasket material consists of a metal core sandwiched between intermediate layers of phosphate and outer layers formed from polytetrafluoroethylene which may be mixed with molybdenum disulfide. The phosphate layer is stated to enhance the ability of the PTFE to adhere to the steel, and there is no suggestion that the gasket material described in this patent could be formed without the adhesive phosphate layer.

Other methods of bonding PTFE to metal have also been suggested. The methods described in U.S. Pat. Nos. 3,304,221 and 3,421,972 bond PTFE to metal surfaces by first roughening and cleaning the surface of the metal and applying a layer of particulate material including particulate PTFE to the metal. In the method of Pat. No. 3,304,221, a continuous film layer of polytetrafluoroethylene is then laminated over the PTFE particles. The method of Pat. No. 3,421,972 requires mixing of the PTFE particles with nickel-coated phosphorus particles prior to their application to the metal, then compressing the layer of particles to the metal at superatmospheric pressure and sintering the layer. While the laminate produced by the method of Pat. No. 3,304,221 insures that the metal is completely covered with PTFE, it relies principally upon the ability of PTFE to adhere to metal without adhesives and, therefore, is not likely to withstand the hostile environment of a paper pulping or similar operation. Further, while the addition of the nickel-coated phosphorus particles to the PTFE in the method of Pat. No. 3,421,972 enhances the tensile properties of the PTFE-metal bond, this method requires an additional stress-relieving step to obtain increased bond strength.

U.S. Pat. No. 2,976,093 discloses a method of making a reinforced PTFE laminate wherein PTFE powder is placed in a mold, a perforated metal reinforcing member is placed on the powder, and additional PTFE powder is layered on the metal member. These materials are compacted under pressure to produce a preformed composite, which is then subjected to sintering temperatures. The reinforced PTFE laminate thus produced, however, is characterized by variations in density, surface dimples and inadequate adhesion between the PTFE and the metal. Consequently, gaskets produced according to this process are susceptible to fluid leakage and internal cold flow following the application of an external load. Moreover, creep relaxation and gasket deformation at high temperatures and internal pressures may present substantial problems in gaskets produced according to the aforementioned process that will make them unsuitable for use in these types of environments.

The prior art, therefore, has failed to disclose a PTFE gasket which is characterized by low creep relaxation, minimum cold flow, excellent resistance against deformation and excellent fluid sealability under high external loads at high temperatures and pressures and in the presence of corrosive chemicals. The prior art has further failed to disclose a method of making a laminated filled PTFE-metal reinforced gasketing material having the foregoing characteristics wherein the PTFE is actually bonded to the metal without binders or adhesives.

SUMMARY OF THE INVENTION

It is, therefore, a primary object of the present invention to overcome the disadvantages of the prior art and to provide a filled PTFE reinforced gasketing material characterized by resistance to creep relaxation, cold flow and deformation to produce a superior seal under high temperatures and external loads in adverse environments and to provide a process for making such a gasketing material.

It is another object of the present invention to provide a filled PTFE metal reinforced multilayer composite material from which gaskets having superior dimensional stability may be individually cut.

It is yet another object of the present invention to provide a filled PTFE metal-reinforced gasketing material from which full face as well as other more complex shaped gaskets may be individually molded.

It is a further object of the present invention to provide a method of making a gasketing material wherein at least one metal reinforcement is encapsulated by PTFE in a manner which avoids the penetration of corrosive materials into the gasket and subsequent gasket deterioration.

It is a still further object of the present invention to provide a gasketing material suitable for sealing glass lined flanges.

It is still another object of the present invention to provide a process for producing a filled PTFE-metal laminate gasketing material which bonds the PTFE firmly to the metal without adhesives or binders.

The aforesaid objects are achieved by providing a process for producing a filled PTFE, metal-reinforced laminated gasketing material including the steps of forming a first sheet of (PTFE and a suitable filler material,) cutting the sheet to form smaller sheets of a desired size if appropriate, forming a laminate by placing the properly sized sheets of PTFE/filler material alternately with at least one thin sheet of (perforated metal) so that the outer sheets are PTFE/filler material, (wrapping the top and bottom of the laminate thus formed with aluminum foil to form an assembly,) placing this assembly between supporting steel sheets, pressure sintering the assembly by the application of defined increments of temperature and pressure over selected intervals, and then rapidly cooling the assembly under pressure to form the finished gasketing material. This process may be employed to form sheets of gasketing material from which individual gaskets can be cut or to form single gaskets that are individually molded.

The present invention also provides a composite gasketing material characterized by high strength, excellent recovery and superior creep relaxation resistance wherein at least one metal reinforcing member is encapsulated by and has bonded thereto outer layers of a PTFE/filler material.

Other objects and advantages will be apparent from the following description, claims and drawings.

BRIEF DESCRIPTION OF THE DRAWINGS

FIG. 13 illustrates graphically the results of a hot compression test of 1/32 inch thick gasketing material;

FIG. 14 illustrates graphically the results of a hot compression test of 1/16 inch thick gasketing material; and FIG. 15 illustrates graphically the results of a hot compression test of ⅛ inch thick gasketing material.

BEST MODE FOR CARRYING OUT THE INVENTION

Figure 1:
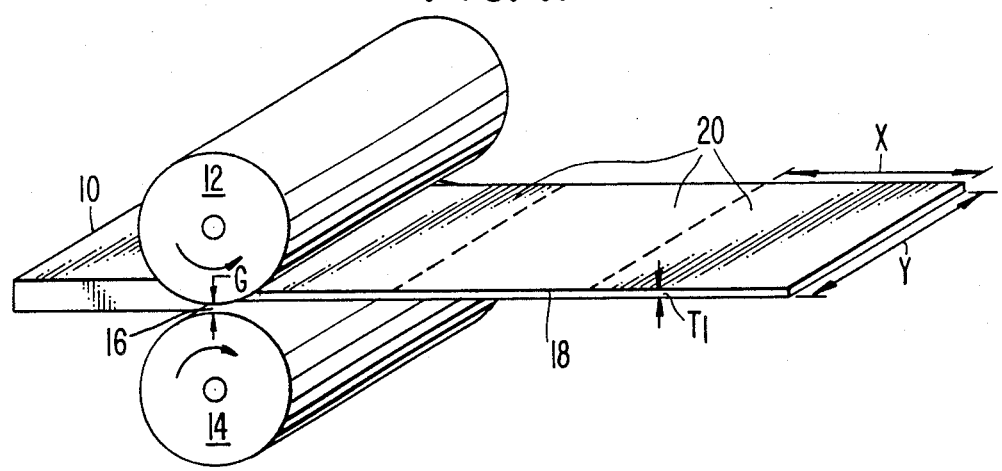
FIG. 1 illustrates schematically the formation of an unsintered PTFE/filler sheet for use in the present invention.

The present invention provides an improved gasket material and a process for preparing such a gasket material. Gasketing products produced as described herein demonstrate superior physical and functional properties in applications where conventional gasketing materials have failed. Evaluations of the gasket material produced according to the process described herein demonstrate that this material displays superior creep relaxation resistance, improved recovery, excellent sealing capacity and substantially increased material strength when compared to previous PTFE gasketing materials. Moreover, it was discovered that the present process actually bonds the filled PTFE to the reinforcing metal. The strong filled PTFE-metal bonds resulting from this process are obtained without etching or prior treatment of the metal and without binders or adhesives. Composite gasketing materials can be readily made in the form of sheets from which the individual gaskets can be cut or, alternatively, in the form of individual gaskets in suitable molds. The versatility of the present process permits the production of high performance gaskets of special sizes and configurations with the same ease as gaskets of standard sizes and shapes.

The gasketing material produced according to the process of the present invention is a multilayer laminated composite that takes a variety of forms. This material may be structured as shown in the drawings or may have a different arrangement, depending on the end use or application of the gasket formed from the composite. The materials preferred for use in the present process are filled polytetrafluoroethylene (PTFE), stainless steel and aluminum foil. Filled PTFE is preferred for use in the present process since the processing conditions described below do not produce the same superior results when unfilled or pure PTFE is used. (Both barium sulfate and silica (e.g., Opal Supersil Silica) have been demonstrated to function effectively as fillers in this process.) Other fillers and mixtures of more than one kind of filler, however, may also produce equally improved gasketing materials. In one embodiment of the invention (glass microballoons) may be used as a filler material for gasket applications in which high compressibility is required. The filled PTFE may be in the form of either sintered or unsintered sheets. Sintered PTFE/filler sheets that can be successfully employed in the present process to produce superior gasketing materials are available from Garlock Inc under the designations Style 3500, which is a sintered PTFE/silica sheet, and Style 3510, which is a sintered PTFE/barytes sheet. Other commercially available sintered or unsintered PTFE/filler sheets may also be used advantageously to form the gasketing material of the present invention.

FIG. 1 illustrates a (well-known process) for the preparation of an unsintered PTFE/filler sheet for use in forming the superior gasketing material of the present invention. PTFE/silica, PTFE/barytes, or other PTFE/filler blends may be used in this process. The PTFE/filler blend selected is mixed with Stoddard solvent (petroleum naphtha) in a high speed mixer and then filtered and pressed to remove most of the solvent. A PTFE/filler cake 10 is obtained. The cake 10 is passed back and forth through a nip 16 formed between calendar rolls 12 and 14. A sheet 18 of PTFE/filler having a thickness $T_1$ is formed. The final gap G of the nip 16 controls the final thickness $T_1$ of the sheet 10.

The sheet 18 is cut into segments 20 having the dimensions X and Y as shown in FIG. 1. The cut sheet segments 20 are dried, either in a batch type or conveyor type oven, which removes most of the remaining solvent. The time required to dry the sheet segments 20 depends on their thickness $T_1$. Drying time in a batch oven at 250 degrees F. varies from 2.5 hours for a 1/32 inch sheet to 5 hours for a sheet ⅛ inches thick. Any residual solvent contained in the sheet 20 will be eliminated by further processing.

Figure 2:
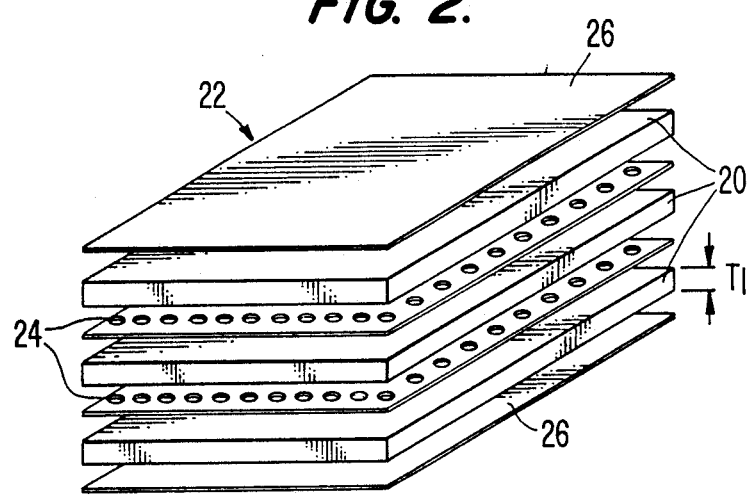
FIG. 2 illustrates diagramatically the components of a multilayer gasketing material according the the present invention.

FIG. 2 illustrates one possible composition of a multilayer composite gasketing material 22. The thickness of the finished composite sheet can vary, but preferably should be about ⅛ inch for most applications. The X and Y dimensions are ideally 24 inches×24 inches or 32 inches×32 inches, although other sizes could be used as well. The thickness $T_1$ of each ply of PTFE/filler material will depend in large measure upon the desired thickness of the final composite. The gap G of nip 16 can be adjusted accordingly to produce PTFE/filler sheets of the desired thickness. The composite of FIG. 2 includes three PTFE/filler sheets, although, as mentioned above, other numbers of these sheets could be employed.

Reinforcement of the gasketing materials of the present invention is achieved by providing one or more sheets of metal, preferably stainless steel, which contact the PTFE/filler sheet and impart dimensional stability and other desirable properties to the composite. A major advantage of using stainless steel sheets is that they do not chemically or mechanically alter the surface characteristics of the PTFE/filler material. It has been discovered that perforated stainless steel produces results superior to those obtained with nonperforated stainless steel. A stainless steel sheet material particularly preferred for use in the present gasket product and process is known as 316 SS, which is 0.008 inches thick and has a staggered pattern of perforations. The perforations are 1/16 inches in diameter, with 3/32 inches between their centers. Each square inch of perforated sheet optimally has about 41% open area. Stainless steel sheets having these characteristics are readily available commercially in sheets of 24 inches×24 inches or 32 inches×32 inches. However, the size of the stainless steel sheets should be selected to be slightly larger than that of the PTFE/filler sheets for reasons that will be discussed in greater detail below. The stainless steel reinforcement sheers should be in degreased form to be ready for use in forming the present gasketing materials. FIG. 2 shows two perforated stainless steel sheets 24 inserted between adjacent pairs of the PTFE/filler sheets 20.

The gasketing material composite 22 of FIG. 2 further includes outer layers 26, which are preferably aluminum foil, but could be formed of any similar material. The primary function of the aluminum foil is to protect the surface of the gasketing material during handling as well as during the pressure stages of the present process described below. At the end of the process, the foil is stripped from the gasket composite. One available aluminum foil suitable for use in this process is 0.001 inches thick, is temper hard and is available in 24 and 32 inch wide rolls.

Figure 3:
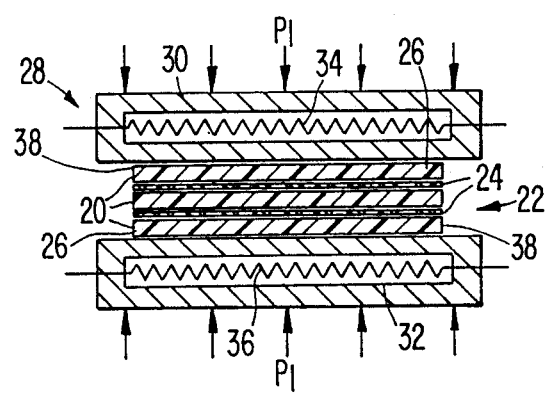
FIG. 3 illustrates diagramatically the pressure sintering step of the present invention.

The multilayer composite 22 of FIG. 2 is subjected to a pressure sintering step, which is shown diagramatically in FIG. 3. First the composite 22 is placed between a pair of stainless steel sheets (not shown) to facilitate the handling and transfer of the assembly. These sheets are preferably on the order of 0.030 inches thick. The entire assembly is then transferred to a sintering press 28. The sintering press includes an upper platen 30 and a lower platen 32. The upper platen 30 includes an electric heating element 34, and the lower platen 32 includes a similar heating element 36. The heating elements 34 and 36 must extend over the entire width of the composite 22 to insure proper sintering of the outermost edges 38 of the composite. Once the composite 22 is placed in the press 28, pressure, represented by the arrows in FIG. 3 is applied to the composite through the platens 30 and 32. The pressure load $P_1$ should be equally distributed over the entire area of each platen.

During the pressure sintering process the heating elements 34 and 36 are heated to 750 degrees F., which is sufficiently above the gel point of both sintered and unsintered PTFE/filler sheets to achieve a strong filled PTFE-metal bond. The specific sintering temperature selected will depend upon the gel point for the PTFE-filler combination used to form the gasketing material. A temperature of 750 degrees F., however, will achieve the desired results for almost all applications.

The actual pressure sintering cycle to which the composite 22 is subjected is divided into five intervals or stages. The last three of these intervals are depicted graphically in FIG. 4. During interval A—B (not shown in FIG. 4) the composite 22 is subjected to approximately 10 to 15 seconds of preheating at a pressure $P_1$ of about 100 psi. This both preheats the material and also eliminates any waviness that might be present in the PTFE/filler sheets 20. In addition, the evacuation of residual moisture and solvent from the PTFE/filler material is initiated by this first preheating step.

Interval B—C (also not shown in FIG. 4) commences after approximately 15 seconds when residual moisture and solvent vapor fumes are visible. The pressure $P_1$ is then reduced to 0 psi and the platens 30 and 32 are opened momentarily and then closed so that the pressure on the composite 22 is again about 100 psi. This rapid pressure change is referred to as low pressure bumping and is repeated 3 to 5 times to accelerate the evacuation of the residual solvent and moisture in the composite 22. At this point in the sintering process, the PTFE/filler sheets 20 and stainless steel reinforcing sheets 24 are still the separate and distinguishable entities shown in FIG. 3. At the end of this stage of the process approximately 90% of the residual solvent has been evacuated.

Figure 4:
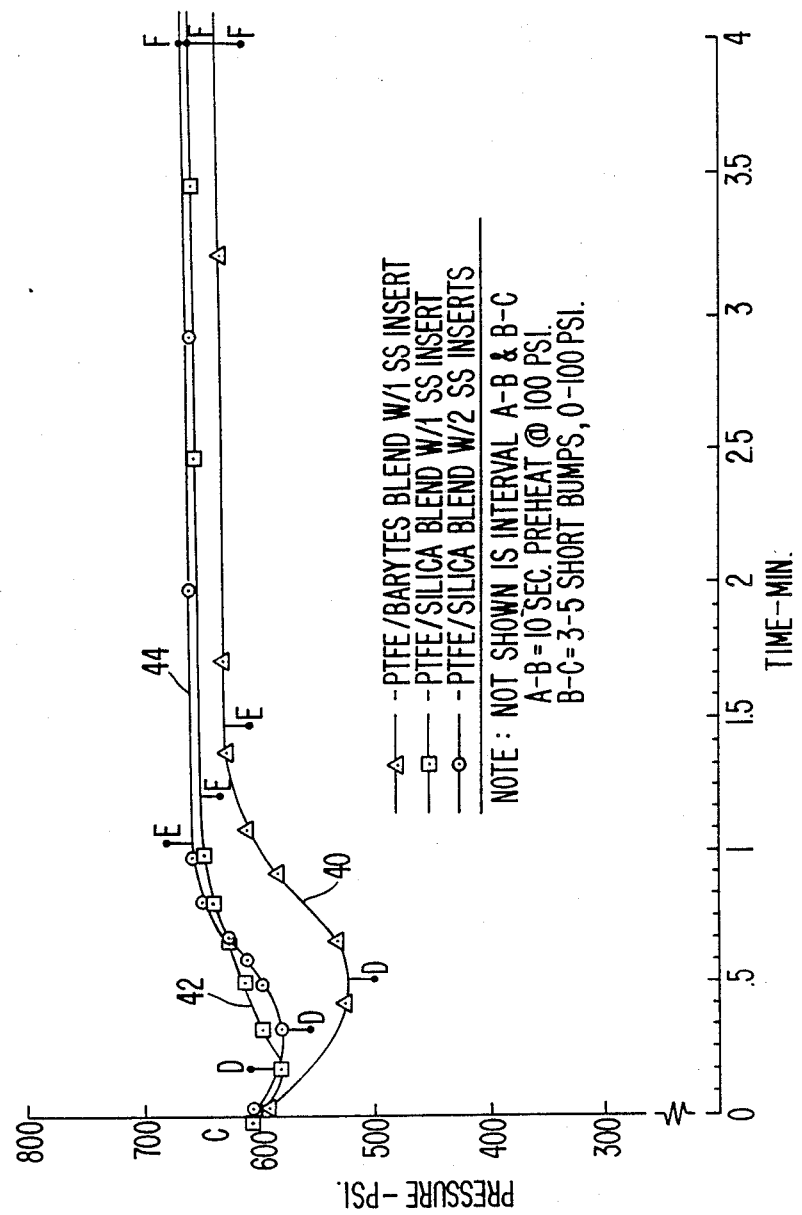
FIG. 4 illustrates graphically a pressure sintering cycle in accordance with the present invention.

Interval C—D is the first stage in the process shown in FIG. 4. Up to this point the composite 22 has been in the pressure sintering assembly a total of about 20 to 30 seconds. At the beginning of this interval the pressure $P_1$ on the platens 30 and 32 is immediately increased to about 600 psi. As the PTFE/filler material slowly reaches the gel state, a drop in pressure is recorded from the beginning point C to the end point D of this interval. During the C—D interval the PTFE/filler material is being densified and forced through and around the perforations in reinforcing sheets 24, while evacuation of residual vapor fumes continues. It can be understood from this stage why the metal reinforcement sheets 24 are required to be larger than the PTFE/filler sheets 18. If the metal sheets 24 do not extend beyond the edges 38 of the composite 22 as shown in FIG. 3, the metal sheets 24 will become completely enclosed by the PTFE/filler material. The result will be the entrapment of residual fumes, leading ultimately to blistering and delamination of the layers of the composite 22. During the next stage, interval D—E in FIG. 4, it will be noted that point D is a critical point. The PTFE/filler material is close to the melting point and, as it actually changes from a solid state to a gel state at point D, this material expands. Expansion of the PTFE/filler material causes the pressure $P_1$ to increase above the 600 psi pressure shown at point C and then to level off at point E.

The amount of expansion of the PTFE/filler material is dependent upon the amount and type of filler used with the PTFE. FIG. 4 illustrates three different PTFE/filler-metal reinforcement arrangements. Curve 40 is representative of pressure changes and expansion when barytes (barium sulfate) is used as the PTFE filler and the composite contains one stainless steel reinforcing sheet or insert. Curves 42 and 44 both represent the behavior of PTFE and a silica filler. However, the composite of curve 42 includes only one stainless steel reinforcing sheet, while the composite of curve 44, like composite 22, includes two stainless steel reinforcement sheets.

Figure 5:
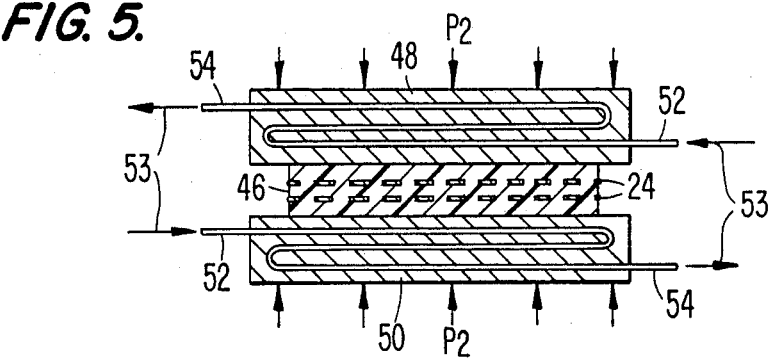
FIG. 5 illustrates diagramatically the rapid cooling step of the present invention.
Figure 6:
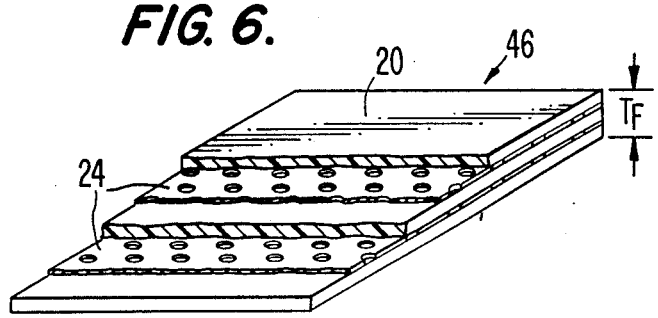
FIG. 6 is a fragmentary perspective view of the composite of FIG. 2 following processing according to the present invention.

The D—E interval is a very critical stage in the pressure sintering process because (additional strike through and extrusion of the PTFE/filler material occurs in and around the perforations of the stainless steel sheet.) Mechanical bonding between the filled PTFE and the steel sheet takes place during this stage. Moreover, the PTFE/filler sheets are chemically fused together during this stage to produce the homogeneous structure 46 which substantially totally encapsulates the stainless steel sheets 24 as shown in FIGS. 5 and 6.

Up to point E in the process, the composite 22 has experienced a total dwell time in the sintering press (Interval A—E) of about 1.5 to 2.0 minutes at 750 degrees F., which allows the PTFE/filler material to fully reach the gel state and fuse together. This is shown in FIG. 4 by the leveling off of the pressure curves, which indicates a constant pressure $P_1$. Once the PTFE/filler material reaches the gel state, it is considered to be fully sintered. The resulting composite can, therefore, be transferred and cooled at any point in the E—F interval.

The total time required for sintering will depend upon the thickness of the composite 22. For example, a 1/16 inch thick composite of two plies of PTFE/silica and one ply of perforated stainless steel will require about 60 seconds to sinter. A composite of the same materials that is ⅛ inch thick requires about 83 seconds to sinter. Prolonged sintering at 750 degrees F. is inadvisable. Such sintering does not improve the results obtained but, rather, results in degradation or gradual loss of the PTFE to toxic products.

(It is advisable to provide an exhaust system for the sintering apparatus as a precautionary measure to avoid the accumulation of any toxic products that might be released to the working area during the sintering process.)

The next step in the present process is a rapid cooling step under pressure, which is shown diagramatically in FIG. 5. The sintered composite is transferred from the sintering press of FIG. 3 to the cooling apparatus of FIG. 5. The sintered composite 46 is placed between fluid-cooled platens 48 and 50. Cooling fluid or coolant is circulated through inlets 52 and outlets 54 in the direction shown by arrows 53. Pressure $P_2$, represented by the arrows in FIG. 5, is applied to the platens 48 and 50. The pressure $P_2$ is equal to the pressure $P_1$, which is 600 psi. This pressure is maintained for about 3 to 4 minutes. This rapid pressure cooling step is required to keep the composite 46 flat as it cools and to maintain a strong and uniform bond between the PTFE/filler material and the metal reinforcing sheets. The composite does not exhibit planar shrinkage because the steel reinforcing sheets 24 prevent shrinkage. However, a slight reduction in the thickness of the composite 46 will occur as the material cools under the pressure load $P_2$.

The composite 46 is shown in cross-section in FIG. 5 and in a fragmentary view in FIG. 6. The three PTFE/filler sheets 20 have fused together and totally encapsulated the steel sheets 24. As noted above, fusing and bonding of the PTFE filler material was accomplished during Interval C—D of the pressure sintering stage of the process. The final product shown in FIG. 6 should optimally have a thickness $T_f$ of 0.125±0.010 inch.

Gasketing materials having a different final thickness $T_f$ will require a variation of process conditions from those described in connection with FIGS. 2-6. Process parameters for different thicknesses and numbers of plies of an unsintered PTFE/silica blend are set forth in Table I below.

The versatility of the process of the present invention permits the manufacture of both standard ring gaskets and gaskets of special configurations with equal facility from the PTFE/filler metal composition 46 of FIGS. 5 and 6. As will be discussed in detail below, these gaskets are particularly well suited for applications where blow-out protection as well as chemical resistance is required. Blow-out protection of the composite is provided by including multiple layers of 0.008 inches thick perforated metal.

Figure 7:
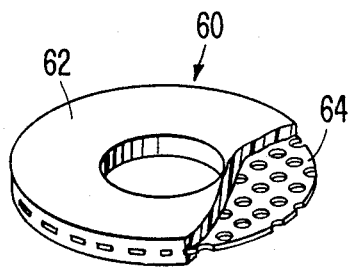
FIG. 7 illustrates, in fragmentary perspective view, a finished gasketing material according to the present invention having a single metal reinforcement layer.
Figure 8:
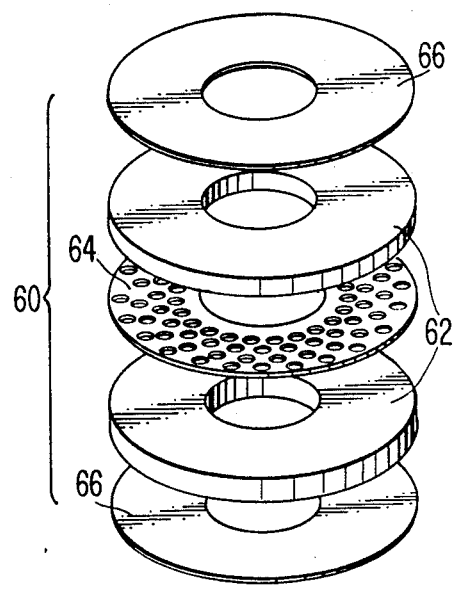
FIG. 8 illustrates an exploded perspective view of the gasketing material of FIG. 7 prior to processing.

The production of molded gaskets with the composite gasketing materials produced according to the process of the present invention is described in connection with FIGS. 7-11. To produce a gasket having a ring-shaped configuration such as the one shown in FIG. 7, unsintered PTFE/filler rings 62 (FIG. 8) are cut from a sheet of unsintered PTFE/filler material, such as sheet 18 in FIG. 1, by stamping or the like. A perforated stainless steel ring 64 cut to the approximate size of rings 62 is placed between the PTFE/filler rings 62 as shown in FIG. 8. Aluminum foil rings 66, cut to the same size and shape as rings 62 are placed at the top and bottom of the assembly of FIG. 8 to provide protection for the surface of the PTFE filler rings 62 during handling.

Figure 9:
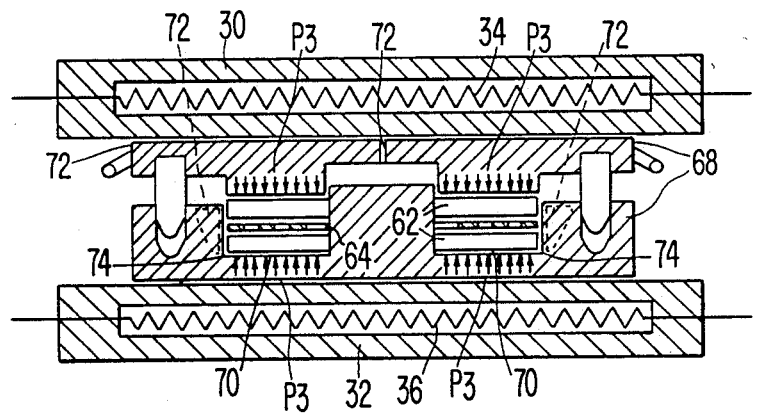
FIG. 9 illustrates diagramatically the pressure sintering of a molded gasket according to the present invention.

Unlike the sheets of gasketing material produced as described in connection with FIGS. 2-6, it is desired to form the finished gasket in the specific ring shape shown in FIG. 7. Consequently, the pressure sintering steps should be conducted in a mold, such as the two part mold 68 shown in FIG. 9, which is placed in a sintering press like the sintering press of FIG. 3 for the sintering operation. The mold 68 is first placed in the press between the platens 30 and 32. Heating elements 34 and 36 supply the heat required to preheat the mold 68 to 750 degrees F. The mold is removed from the press, the gasket assembly 60 of FIG. 8 is placed in the cavity 70 of the mold 68, and the mold is returned to the press. The stainless steel ring 64 is centered by the outside diameter of cavity 70. The pressure $P_3$ shown by the parallel arrows in FIG. 9 is equal to the pressure $P_1$. Optimally, $P_3 = P_1 = 600$ psi, and this pressure is maintained over a period of time which depends upon the thickness of the gasket. Reference to Table I will yield the appropriate length of time required for a given gasket thickness.

As previously discussed, venting of the sintering operation is essential because of the potentially toxic residual fumes which must be evacuated. Consequently, mold cavity 70 must be properly vented, and a number of vents 72 are provided for this purpose.

When the PTFE/filler layers 62 are fused together and completely sintered, the gasket 60 is cooled as discussed in connection with FIG. 5. The gasket is removed from the mold 68 and then pressed between two fluid cooled platens, such as platens 48 and 50 in FIG. 5. The cooling pressure on the gasket, $P_2$, is equal to 600 psi, and this pressure is maintained for about 3-4 minutes. Table I provides additional information regarding cooling pressure and times for gasketing materials of different thicknesses.

The process of the present invention permits the production of many types and sizes of gaskets. The final thickness $T_f$, for example, can be varied by using a PTFE/filler sheet for the PTFE/filler plies of the laminate that has a greater or lesser thickness. In addition, different numbers of metal reinforcing sheets could be used as well, although the metal sheets are used primarily for strength and dimensional stability. The additional plies of PTFE/filler material required to surround the metal, however, will contribute to the thickness of the gasket.

FIGS. 7-11 show the production of a precut ringtype gasket in a mold. A gasket having the same shape could also be cut from the composite sheet 46 of FIG. 6. If the precut metal reinforcement 64 of FIG. 8 is smaller than the precut PTFE rings 62, the metal ring should be completely encapsulated by the PTFE/filler material, whereas a ring cut from composite 46 (FIG. 6) will have at least some exposed metal on the edges.

Another application for which gaskets produced according to the present invention are ideal is pipes that have glass-lined flanges. These pipes typically carry extremely corrosive materials which will readily break down even stainless steel. However, because the gasketing material produced as described herein completely encapsulates the metal with PTFE/filler material, the stainless steel is not exposed and therefore is not contacted by the corrosive. If gaskets produced according to the aforementioned process are intended for use in glass-lined pipes, the filler material most suitable for such applications is one that will insure maximum compressibility of the gasketing material. Glass lined flanges ideally require a gasket with compressibility that exceeds 25%. Glass microballoons, such as Extendospheres XOL-200, are used as the filler material in the PTFE/filler blend in place of silica, barytes or another filler to form the sheet 18, which is then processed as described in connection with FIGS. 7-11 to produce a gasket having a compressibility of 25-30%. This is in distinct contrast to the compressibility of available gaskets for glass-lined pipe applications which ranges from

TABLE I

| Gasketing Material (1) | | Perforated SS Reinforcement (2) | | PTFE/Silica Blend (3) | | Pressure Sintering (4) | | | | | Rapid Pressure Cooling | | |
|---|---|---|---|---|---|---|---|---|---|---|---|---|---|
| Thk. (In.) | Size (In.) | No. of Plies | Thk. (In.) | Thk. (In.) | No. of Plies | Pre-heat Sec. @ 100 PSI | Bumps @ 100 PSI Max. | Press. (PSI) $P_1$ | Temp (°F.) | Time (Min) | Press. (PSI) $P_2$ | Time (Min) | Thickness of Composite (In.) |
| 1/32 | 24" × 24" | 1 | .008 | .015 ± .002 | 2 | 5 | 2-3 | 650 | 750 | 3 | 650 | 3 | .031 ± .005 |
| 1/16 | 24" × 24" | 1 | .008 | .030 ± .002 | 2 | 5 | 2-3 | 600 | 750 | 3 | 600 | 3 | .062 ± .00 |
| ⅛ | 24" × 24" | 1 | .008 | .065 ± .003 | 2 | 10 | 3-5 | 600 | 750 | 4 | 600 | 4 | .125 ± .010 |
| ⅛ | 24" × 24" | 2 | .008 | .040 ± .002 | 3 | 10 | 3-5 | 600 | 750 | 4 | 600 | 4 | .125 ± .010 |

NOTES:
(1) For physical and functional properties for each material see Table II-IV. Other standard and nonstandard thicknesses can be easily manufactured. Size is controlled by the perforated SS reinforcement.
(2) Reinforcement is 316 SS. 1/16 Rd. perforation with 3/32 staggered centers and 41% open area. A .010" thick reinforcement can be used for additional strength.
(3) The PTFE/Silica material is unsintered. True for other PTFE/filler blends, such as PTFE/Barytes blend.
(4) True for individual gaskets manufactured with insert encapsulated on the I.D. of gasket. Longer preheat times will be needed for thick plate molds, such as shown in FIG. 9.

Figure 10:
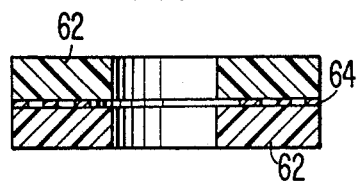
FIG. 10 is a cross-sectional view of the gasketing material of FIG. 7 prior to the completion of pressure sintering.
Figure 11:
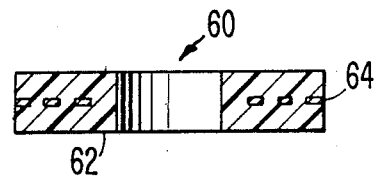
FIG. 11 is a cross-sectional view of the gasketing material of FIG. 8 after pressure sintering.

FIGS. 10 and 11 show an enlarged cross-sectional view of the gasket 60 before (FIG. 10) and after (FIG. 11) pressure sintering. Prior to pressure sintering, the layers or plies of PTFE/filler material (62) and the perforated metal ring (64) are separate. After pressure sintering, the PTFE/filler material 62 and the metal 64 are chemically fused and bonded together as shown in FIG. 11. In the ring-shaped gasket 60 of FIGS. 7 and 11 the inside diameter of metal ring 64 is completely encapsulated by the PTFE/filler material.

5-10%. Gaskets made from a PTFE/glass microballoon blend-metal composite have all of the superior properties of the gaskets of FIG. 11 plus high compressibility.

The composite gasketing materials produced according to the present invention have been tested and evaluated, primarily in accordance with the rules and procedures of the American Society for Testing and Materials (ASTM) for gasketing materials. In addition, a blowout test, which tests the resistance of gaskets to blowout at varying temperatures and pressures, and a hot compression test, which measures the compression set of gasketing materials subjected to heat and constant gasket load over a short time period, were conducted. Three different thicknesses of gasketing materials, 1/32 inch, 1/16 inch and ⅛ inch, were tested. The 1/32 and 1/16 inch gaskets evaluated were made of three kinds of material: a conventional pure PTFE gasketing material, a filled PTFE gasketing material (Garlock Style 3500), and a composite like that of FIG. 11 including one perforated stainless steel insert or ply and two outer plies of a PTFE/silica blend. The ⅛ inch gasketing materials tested did not include pure PTFE of this thickness, but evaluated instead a composite like that of FIG. 6 which includes two perforated stainless steel inserts or plies and three PTFE/silica plies.

Figure 12:
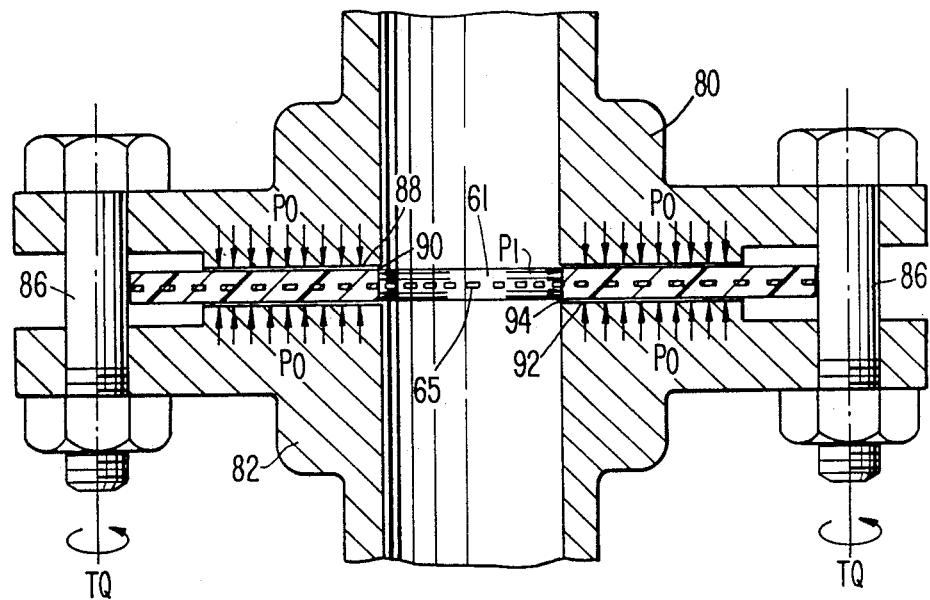
FIG. 12 is a cross-sectional view of a flanged joint including a gasket formed according to the present invention.

The blow-out test evaluates the resistance of gaskets to blow-out at various temperatures and pressures. FIG. 12 illustrates an apparatus similar to that which may be used to conduct this test. The device of FIG. 12 is essentially a two flange pipe joint. To use this device to conduct the blow-out test, one of the flanges 80 or 82 must be capped or sealed in a suitable manner to allow the buildup of pressure on the gasket 61. The flanges 80 and 82 are the standard ANSI-2500 pounds series, which are designed for high internal pressures. Nitrogen gas is used for the test fluid, and the internal pressure can be varied from atmospheric to 5000 psi. At a temperature of 500 degrees F., the gasket 61 is held between the flanges 80 and 82 by an external load $P_0$, which is applied by adjusting the torque (TQ) of eight one inch diameter alloy steel bolts 86, only two of which are shown in FIG. 12. The torque applied for this test is varied according to thickness of the gasketing material as set forth below.

| Thickness of Gasket | Torque (TQ) |
|---|---|
| 1/32 Inch | 32 ft lbs |
| 1/16 Inch | 45 ft lbs |
| ⅛ Inch | 62 ft lbs |

TABLE II

Physical and Functional Properties
1/32" Thick
Gasketing Material

|  | Conventional PTFE Gasketing Material Pure PTFE | | PTFE/Silica Blend Gasketing Material | | PTFE/Silica Blend One (1) Steel Insert | | |
|---|---|---|---|---|---|---|---|
| 1. Creep Relaxation, (%) ASTM F38, Method B 22 hrs. at 212° F. | 49.6 | | 25.5 | | 20.1 | | |
| 2. Compressibility, (%) ASTM F36 | 38.7 | | 14.7 | | 8.1 | | |
| 3. Recovery, (%) ASTM F36 | 37.4 | | 46.3 | | 46.2 | | |
| 4. Tensile Strength, (psi) | Long. | Trans. | Long. | Trans. | Long. | Trans. | Diag. |
| ASTM F152, Longitudinal | 1. 4718 | 4577 | 2183 | 1844 | 7824 | 8457 | 7862 |
| Traverse and Diagonal | 2. 4711 | 3383 | 2120 | 1916 | 7555 | 8712 | 6740 |
| Where Indicated | 3. 5131 | 3295 | 2273 | 1865 | 7818 | 7256 | 6808 |
|  | Avg. 4853 | 3752 | 2193 | 1875 | 7732 | 8142 | 7137 |
| 5. Elongation, (%) |  |  |  |  |  |  |  |
| ASTM F152 | 1. 367.1 | 428.2 | 293.5 | 439.0 | 0 | 0 | 0 |
|  | 2. 401.7 | 315.3 | 290.1 | 414.0 | 0 | 0 | 0 |
|  | 3. 417.1 | 352.6 | 297.8 | 390.0 | 0 | 0 | 0 |
|  | Avg. 395.4 | 365.4 | 293.8 | 414.4 |  |  |  |
| 6. Blowouts at 500° F., (psi) |  |  |  |  |  |  |  |
| * = Burst | 1. 2100* | | 5000* | | 5000** | | |
| ** = No Burst | 2. 1750* | | 4000* | | 5000** | | |
|  | 3. 4720* | | 5000** | | 4900* | | |
|  | Avg. 2857 | | 4667 | | 4967 | | |
| 7. Sealability, (ml/hr.) ASTM F37, Method B Isooctane Internal Pressure: 9.8 psi |  |  |  |  |  |  |  |
| A. Gasket Load: 1000 psi | 1. 0.0 | | 0.0 | | 0.0 | | |
|  | 2. 0.0 | | 0.0 | | 0.0 | | |
|  | 3. 0.0 | | 0.0 | | 0.0 | | |
| B. Gasket Load: 500 psi | 1. 0.0 | | 1.0 | | 1.0 | | |
|  | 2. 0.0 | | 1.5 | | 0.0 | | |
|  | 3. 0.0 | | 1.5 | | 0.0 | | |

TABLE III

Physical and Functional Properties
1/16" Thick
Gasketing Material

|  | Conventional PTFE Gasketing Material Pure PTFE | PTFE/Silica Blend Gasketing Material | PTFE/Silica Blend One (1) Steel Insert |
|---|---|---|---|
| 1. Creep Relaxation, (%) ASTM F38, Method B 22 hrs. at 212° F. | 69.4 | 43.4 | 21.7 |
| 2. Compressibility, (%) ASTM F36 | 16.9 | 13.0 | 7.3 |
| 3. Recovery, (%) |  |  |  |

TABLE III-continued

Physical and Functional Properties
1/16" Thick
Gasketing Material

| | Conventional PTFE Gasketing Material Pure PTFE | | PTFE/Silica Blend Gasketing Material | | PTFE/Silica Blend One (1) Steel Insert | | |
|---|---|---|---|---|---|---|---|
| ASTM F36 | 56.8 | | 45.3 | | 50.0 | | |
| 4. Tensile Strength, (psi) | Long. | Trans. | Long. | Trans. | Long. | Trans. | Diag. |
| ASTM F152, Longitudinal | 1. 3878 | 4102 | 2435 | 2158 | 5273 | 4991 | 4798 |
| Traverse and Diagonal | 2. 4235 | 3512 | 2571 | 2226 | 4921 | 5028 | 4892 |
| Where Indicate | 3. 3905 | 4325 | 2567 | 2147 | — | — | — |
| | Avg. 4006 | 3980 | 2524 | 2177 | 5097 | 5010 | 4845 |
| 5. Elongation, (%) | | | | | | | |
| ASTM F152 | 1. 309 | 326 | 285.8 | 359.1 | 0 | 0 | 0 |
| | 2. 330 | 289 | 296.2 | 353.3 | 0 | 0 | 0 |
| | 3. 303 | 333 | 294.7 | 378.5 | 0 | 0 | 0 |
| | Avg. 314 | 316 | 292.2 | 363.6 | | | |
| 6. Blowouts at 500° F., (psi) | | | | | | | |
| * = Burst | 1. 4000* | | 4700* | | 5000** | | |
| ** = No Burst | 2. 4600* | | 5000** | | 5000** | | |
| | 3. 3040* | | 5000** | | 5000** | | |
| | Avg. 3880 | | 4900 | | 5000 | | |
| 7. Sealability, (ml/hr.) ASTM F37, Method B Isooctane Internal Pressure: 9.8 psi | | | | | | | |
| A. Gasket Load: 1000 psi | 1. 0.0 | | 0.0 | | 0.0 | | |
| | 2. 0.0 | | 0.0 | | 0.0 | | |
| | 3. 0.0 | | 0.0 | | 0.0 | | |
| B. Gasket Load: 500 psi | 1. 1.5 | | 1.5 | | 0.0 | | |
| | 2. 1.0 | | 1.5 | | 0.0 | | |
| | 3. 1.5 | | 1.5 | | 0.0 | | |

TABLE IV

Physical and Functional Properties
⅛" Thick
Gasketing Material

| | PTFE/Silica Blend Gasketing Material | | PTFE/Silica Blend One (1) Steel Insert | | | PTFE/Silica Blend Two (2) Steel Inserts | | |
|---|---|---|---|---|---|---|---|---|
| 1. Creep Relaxation, (%) ASTM F38, Method B 22 hrs. at 212° F. | 57.9 | | 38.7 | | | 30.5 | | |
| 2. Compressibility, (%) ASTM F36 | 11.3 | | 4.6 | | | 4.8 | | |
| 3. Recovery, (%) ASTM F36 | 39.7 | | 54.7 | | | 53.6 | | |
| 4. Tensile Strength, (psi) | Long. | Trans. | Long. | Trans. | Diag. | Long. | Trans. | Diag. |
| ASTM F152, Longitudinal | 1. 2218 | 2134 | 3496 | 3027 | 3077 | 5990 | 5191 | 5379 |
| Traverse and Diagonal | 2. 2280 | 2175 | 2956 | 2956 | 3109 | 5930 | 5272 | 5618 |
| Where Indicated | 3. 2324 | 2138 | — | — | — | 5893 | — | — |
| | Avg. 2274 | 2149 | 3226 | 2992 | 3093 | 5937 | 5231 | 5499 |
| 5. Elongation, (%) | | | | | | | | |
| ASTM F152 | 1. 314.7 | 320.6 | 0 | 0 | 0 | 0 | 0 | 0 |
| | 2. 316.3 | 323.7 | 0 | 0 | 0 | 0 | 0 | 0 |
| | 3. 298.1 | 321.5 | 0 | 0 | 0 | 0 | 0 | 0 |
| | Avg. 309.7 | 321.9 | | | | | | |
| 6. Blowouts at 500° F., (psi) | | | | | | | | |
| * = Burst | 1. 3750* | | 4520* | | | 5000** | | |
| ** = No Burst | 2. 4160* | | 4000* | | | 5000** | | |
| | 3. 3620* | | 4000* | | | 4800* | | |
| | Avg. 3843 | | 4173 | | | 4933.3 | | |
| 7. Sealability, (ml/hr.) ASTM F37, Method B Isooctane Internal Pressure: 9.8 psi | | | | | | | | |
| A. Gasket Load: 1000 psi | 1. 0.0 | | 0.0 | | | 0.0 | | |
| | 2. 0.0 | | 0.0 | | | 0.0 | | |
| | 3. 0.0 | | 0.0 | | | 0.0 | | |
| B. Gasket Load: 500 psi | 1. 1.0 | | 0.0 | | | 0.0 | | |
| | 2. 1.5 | | 0.0 | | | 0.0 | | |
| | 3. 3.0 | | 0.0 | | | 0.0 | | |

Tables II, III, and IV compare several important physical and functional properties of two types of gasketing materials produced according to the present invention, one having a single stainless steel reinforcing sheet (FIGS. 7-11) and the other having two stainless steel reinforcing sheets (FIGS. 2-6), conventional PTFE gasketing material and a silica filled PTFE gasketing material. The silica filled PTFE is made by a process that includes free sintering at 650° to 700 degrees F. and has the same PTFE/silica ratio by weight as the PTFE/silica ratio in the gasketing material produced according to the present invention. Some of the property advantages obtained by the present gasketing material, such as superior creep relaxation, recovery and sealability, were not obtainable with prior art methods of making gasketing material.

The superior creep relaxation obtained by the present gasket material is clearly apparent from a comparison of the data in Table IV, which compares a prior ⅛ inch thick PTFE/silica gasketing material and the present gasketing material with both one and two stainless steel plies or inserts. The new gasketing material with one insert produced a 33.2% reduction in creep relaxation over the PTFE/silica, while the material with two inserts showed a reduction in creep relaxation of 47.3%. For the 1/32 inch and 1/16 inch gasketing material described in Tables II and III, a reduction in creep relaxation of 21.2% and 50% over the PTFE/silica is obtained by the single metal ply gasketing material of the present invention. FIGS. 13-15 also demonstrate the superior creep relaxation resistance of the present gasketing material composite. This material retains its thickness better at elevated temperatures and high external loads than conventional PTFE and PTFE/Silica gasketing materials.

Recovery characteristics of the gasketing materials produced as described herein are likewise improved for thicknesses of 1/16 inch and over, with improvement of 4.7% for 1/16 inch and 15% for ⅛ inch materials being recorded. The recovery does remain the same for the 1/32 inch thick material, however.

The present process densifies the PTFE/silica material and mechanically bonds it to the metal layer and, therefore, directly produces the excellent sealability characteristic of the present gasketing materials. In a two flange pipe joint of the kind shown in FIG. 12, the leakage paths for PTFE gasketing materials are primarily between the flange surfaces 88 and 92 and the gasket surfaces 90 and 94. If the fluid and internal pressure $P_i$ remains constant, the amount of leakage is directly related to the external gasket load $P_o$. Gaskets subjected to high external loads generally have low leakage rates as shown by the sealability test results for gasket loads of 500 and 1000 psi in Tables II-IV. These results also indicate that there is no leakage between the metal sheet 65 and the PTFE/silica material of the gasket 61.

Elongation, tensile strength and blow-out resistance are material strength properties that are controlled by the metal reinforcement in the gasketing material of the present invention. The gasketing composites evaluated in Tables II-IV and FIGS. 13-15 contain metal reinforcement layers which are 0.008 inch thick, have 1/16 inch round perforations, and have 41% open area per square inch. The tensile strength and blow-out resistance can be improved by using a thicker metal reinforcing sheet or by using a metal sheet with smaller perforations and a smaller percentage of open area. For example, a ⅛ inch thick gasket composite with one metal reinforcement sheet 0.008 inch thick having 0.02 inch diameter perforations and 22% open area per square inch was tested at 600 degrees F. and did not exhibit gasket blowout at 575 degrees F. or at 600 degrees F. Filled PFTE gasketing materials, however, have an upper temperature limit of 500 degrees F.

The compression of ring gaskets formed from the three thicknesses of gasketing materials tested above was also evaluated through a hot compression test of the gasketing materials when they are subjected to heat and constant gasket load over a short time period of one-half hour. This test is conducted by placing the gasket to be tested between two electrically heated and polished platens. A constant hydraulic load of 3575 psi is applied on the gasket and maintained throughout the one-half hour test. At the start of the test the temperature is room temperature and is gradually increased to as high as 600 degrees F. As the platens are heated, the polished platen surfaces do not restrict the radial flow of the gasket so that the thickness of the gasket is reduced. There is no fluid or internal pressure involved in this test procedure, only the pressure applied by the platens. Readings for both temperature and thickness were taken every two minutes, and the percent compression at various temperature levels was tabulated. The results of the hot compression tests on 1/32 inch, 1/16 inch and ⅛ inch gasketing materials having the same compositions as those which produced the test data of Tables II-IV are shown graphically in FIGS. 13, 14 and 15.

At the end of the hot compression test, the conventional PTFE gasketing materials had spread radially to produce an irregularly shaped ring with a greatly reduced central opening to resemble a doughnut, the PTFE/silica blend gasketing material showed a lesser degree of radial spread with some irregularity in shape, while the 1/32 and 1/16 inch PTFE/filler-metal composite with one metal ply had spread radially only a small amount. The ⅛ inch PTFE/filler-metal composites had spread radially so that the central opening was reduced somewhat in size, but the gaskets still were regular in shape. At all thicknesses, the gasket formed from the PTFE/silica blend with one perforated stainless steel reinforcing sheet exhibited a significantly lower per cent compression than did the gaskets formed from either pure PTFE or from prior PTFE/Silica gasketing materials. The ⅛ inch thick gasket formed from PTFE/silica blend with two perforated stainless steel reinforcing sheets or inserts showed even a lesser percentage of compression.

As stated hereinabove, the processing conditions of the present invention cause the PTFE/filler material to actually bond to the stainless steel reinforcing sheets. Both sintered and unsintered PTFE/filler sheets prior to pressure bonding in accordance with the present process at temperatures above the gel point (750 degrees F.) bond strongly to the stainless steel reinforcement sheets. Under the same processing conditions, however, pure PTFE does not bond to stainless steel. Tables V and VI below set forth the results of bonding experiments conducted on metal reinforced PTFE/filler gasketing material composites using silica (Table V) and barytes (Table VI) as the filler. The silica filler demonstrated somewhat better bonding than did the barytes. It is likely that other fillers or combinations of fillers will achieve a similar result, and consequently, the use of fillers which function like silica and barytes is contemplated to be within the scope of the present invention.

An application for which gaskets formed according to the present process are especially well-suited is in the blow tank lines of a batch digester in a pulp and paper mill. The temperature cycles ranging from ambient to 340 degrees F. and considerable hammering or shock loading with high internal pressures are the predominate factors contributing to the failure of available filled PTFE gasketing materials. A gasket like that shown in FIG. 7 with one metal reinforcing sheet was tested under the conditions associated with a batch digester. Both PTFE/silica- and PTFE/barytes-reinforced gaskets having a single perforated stainless steel sheet were tested. These gaskets were cut from a ⅛ inch thick sheet of gasketing material produced according to the present invention. The gaskets were placed in pipe joints similar to that shown in FIG. 14. As the system is cooled and subsequently heated the pipe and the two flange joints expand and contract, which results in high and low cycles of external load ($P_o$ in FIG. 12) on the gasket. Gaskets produced as described herein performed successfully under these conditions because of their excellent recovery and creep relaxation resistance properties. Additionally, the high tensile strength and low elongation of the present gaskets did not blow-out or extrude even with the high internal pressures in the digester lines.

INDUSTRIAL APPLICABILITY

The filled PTFE metal reinforced gasketing material of the present invention will be successfully employed to form gaskets for a wide variety of applications where standard filled PTFE gasketing materials have failed to provide a strong, reliable seal. It is contemplated that the process of the present invention can be used to produce gasketing materials for applications where high strength, excellent recovery and superior creep relaxation resistance properties are required.

TABLE V

PTFE/OPAL SUPERSIL SILICA BLEND[1]
BONDING EXPERIMENTS

| PROCESSING DETAILS | #1 | #2 | #3 | #4 | #5 |
| --- | --- | --- | --- | --- | --- |
| 1. PTFE/Silica[1] Material | Garlock Style 3500 Std. Gasketing Mat'l Sintered Sheet 10" × 10" × 1/16 thk. | Unsintered PTFE/Silica Sheet 10" × 10" × 1/16 thk. | Unsintered Same as #2 | Sintered Same as #1 | Sintered Same as #1 |
| 2. Metal Insert | 304 Stainless Steel 2B Finish Perforated-41% Open 10" × 10" × .010 thk. Purchased Degreased | 302 Stainless Steel Unperforated Std. Shim Stock 10" × 10" × .005" thk. Degreased | Same as #2 | Same as #2 | Same as #2 |
| 3. Metal Treatment | None | Mechanical Abrasion with 240 emery paper | None | Same as #2 | None |
| 4. Pressure Sintering @ 750° F. | | | | | |
| Preheat at 0 psi (min) | 1.5 | 1 | 1 | 1.5 | 1.5 |
| Bumps @ 50 psi (max) # | 2 | 3 | 3 | 2 | 2 |
| Sintering Pressure (psi) | 600 | 600 | 600 | 600 | 600 |
| Sintering Time (min) | 7 | 8 | 8 | 7 | 7 |
| 5. Rapid Pressure Cooling | | | | | |
| Cooling Time (min) | 5-6 | 5-6 | 5-6 | 5-6 | 5-6 |
| Cooling Pressure (psi) | 600 | 600 | 600 | 600 | 600 |
| 6. Sintering Results | Very good strike through and fusing of PTFE/Silica Mat'l No Blistering and no delamination noted | No blistering and no delamination Very good surface, color and finish | Same as #2 | Same as #2 | Same as #2 |
| 7. Bonding to Metal | PTFE/Silica Mat'l Bonded to the steel insert | Strong bond to the unperforated insert | Equally strong Bond as in #2 | Same as #2 | Same as #2 |

Note
[1] The PTFE/Silica ratio by weight is the same for all materials.

TABLE VI

PTFE/BARIUM SULFATE BLEND[1]
BONDING EXPERIMENTS

| PROCESSING DETAILS | #1 | #2 | #3 | #4 | #5 |
| --- | --- | --- | --- | --- | --- |
| 1. PTFE/Bleached Barytes[1] Material | Garlock Style 3510 Std. Gasketing Mat'l Sintered Sheet 10" × 10" × 1/16 thk. | Unsintered PTFE/Barytes Sheet 10" × 10" × 1/16" thk. | Unsintered Same as #2 | Unsintered Same as #2 | Sintered Same as #1 |
| 2. Metal Insert | 304 Stainless Steel 2B Finish Perforated-41% Open 10" × 10" × .010" thk. Purchased degreased | 302 Stainless Steel Unperforated Std. Shim Stock 10" × 10" × .005" thk. Degreased | Same as #2 | Same as #2 | Same as #2 |
| 3. Metal Treatment | None | Mechanical abrasion with 240 emery paper | None | None | None |
| 4. Pressure Sintering @ 750° F. | | | | | |
| Preheat at 0 psi (min) | 1 | 50 sec | 1 | 4 | 2.5 |
| Bumps at 50 psi (#) | 2 | 3 | 2 | 2 | 2 |
| Sintering Pressure (psi) | 600 | 600 | 500 | 300 | 200 |
| Sintering Time (min) | 7 | 7 | 6 | 5 | 5 |
| 5. Rapid Pressure Cooling | | | | | |
| Cooling Time (min) | 5 | 5 | 5 | 5 | 5 |
| Cooling Pressure (psi) | 600 | 600 | 500 | 300 | 200 |

TABLE VI-continued

| PROCESSING DETAILS | PTFE/BARIUM SULFATE BLEND[1] BONDING EXPERIMENTS | | | | |
| --- | --- | --- | --- | --- | --- |
| | #1 | #2 | #3 | #4 | #5 |
| 6. Sintering Results | Excellent strike through & fusing of PTFE/Barytes mat'l Good dimensional results. Surface is gray in color instead off-white. | Large dimensional change of 10" × 10" sample noted. No delamination in center of 10.5" × 10.5" sheet. Surface gray in color. | Excessive flow of PTFE/Barytes mat'l noted resulting in delamination of edges. Surface color same as #2. | Minimal dimensional changes in the plane of sheet. Surface color same as #2. | Negligible dimensional change in the the plane of sheet Surface color same as #2 |
| 7. Bonding to Metal | Strong bond developed between steel insert & PTFE/Barytes mat'l | Strong bonding in the center of sheet | Strong bond in the center of sheet | Strong bond in entire sheet | Same as #4 |

Note
[1]The PTFE/Barytes ratio by weight is the same for all materials

I claim:
1. A process for producing a high strength, dimensionally stable gasketing material including the steps of:
   a. forming a first sheet from a blend of polytetrafluoroethylene and at least one filler;
   b. providing a second sheet of perforated metal;
   c. providing a third sheet of aluminum foil;
   d. forming a composite wherein said second metal sheet is layered alternately with said first polytetrafluoroethylene/filler sheets so that the outermost layers are said first polytetrafluoroethylene/filler sheets;
   e. applying a layer of said third foil sheet to cover each outermost layer of said first sheet of said composite;
   f. subjecting the composite formed in step e to pressure sintering at a temperature above the gel point of said polytetrafluoroethylene material; and
   g. subjecting the pressure sintered composite formed in step f to rapid cooling under pressure.

2. The process of claim 1, wherein said first sheet is selected from the group consisting of polytetrafluoroethylene and silica, polytetrafluoroethylene and barium sulfate and polytetrafluoroethylene and glass microballoons.

3. The process of claim 2, wherein said metal is stainless steel.

4. The process of claim 3, wherein one of said metal second sheets is inserted between two of said polytetrafluoroethylene/filler sheets to form said composite.

5. The process of claim 4, wherein the temperature in step f is at least 750 degrees F.

6. The process of claim 5, wherein the pressure sintering of step f includes the steps of
   (i) preheating said composite for 10-15 seconds at about 100 psi;
   (ii) rapidly reducing the pressure on said composite from about 100 psi to 0 psi;
   (iii) rapidly repeating the pressure cycle of steps (i) and (ii) 3-5 times;
   (iv) quickly increasing the pressure on said composite to about 600 psi; and
   (v) maintaining said composite under a pressure of about 600 psi for a time sufficient to completely change said polytetrafluoroethylene/filler to a gel and to cause said gel to extrude through the perforations in said metal sheet, to bond to said metal sheet and to completely encapsulate said metal sheet.

7. The process of claim 6, wherein said rapid cooling step comprises subjecting the pressure sintered composite to a pressure of about 600 psi applied by a fluid-cooled press for a time sufficient to cool said composite.

8. The process of claim 3, wherein two of said metal second sheets are inserted between alternate layers of said polytetrafluoroethylene/filler first sheets to form said composite.

9. The process of claim 8, wherein the temperature in step d is at least 750 degrees F.

10. The process of claim 9, wherein the pressure sintering of step d includes the steps of
    (i) preheating said composite for 10-15 seconds at about 100 psi;
    (ii) rapidly reducing the pressure on said composite from about 100 psi to 0 psi;
    (iii) rapidly repeating the pressure cycle of steps (i) and (ii) 3-5 times;
    (iv) quickly increasing the pressure on said composite to about 600 psi; and
    (v) maintaining said composite under a pressure of about 600 psi for a time sufficient to completely change said polytetrafluoroethylene/filler to a gel and to cause said gel to extrude through the perforations in said metal sheet, to bond to said metal sheet and to completely encapsulate said metal sheet.

11. The process of claim 10, wherein said rapid cooling step comprises subjecting the pressure sintered composite to a pressure of about 600 psi applied by a fluid-cooled press for a time sufficient to cool said composite.

12. A process for producing a high strength, dimensionally stable gasketing material including the steps of:
    a. forming a layered composite including a central layer of perforated stainless steel, two intermediate layers of a sheet formed from a blend of polytetrafluoroethylene and a filler and two outer layers of aluminum foil, wherein one of said intermediate layers is positioned between said central layer and each of said outer layers;
    b. pressure sintering said composite by
       (i) preheating said composite for 10-15 seconds at about 100 psi;
       (ii) rapidly reducing the pressure on said composite from about 100 psi to 0 psi;
       (iii) rapidly repeating the pressure cycle of steps (i) and (ii) 3-5 times;
       (iv) quickly increasing the pressure on said composite to about 600 psi; and
       (v) maintaining said composite under a pressure of about 600 psi for a time sufficient to completely change said polytetrafluoroethylene to a gel and to cause said gel to extrude through the perforations in said stainless steel layer, to bond to said stainless steel layer and to completely encapsulate said stainless steel layer; and c. rapidly cooling the pressure sintered composite under pressure for a time sufficient to cool said composite.

13. The process of claim 12, wherein said intermediate layers are formed from a blend selected from the group consisting of polytetrafluorethylene and silica, polytetrafluoroethylene and barytes and polytetrafluoroethylene and glass microballoons.

14. The process of claim 12, wherein step c comprises applying a pressure of about 600 psi to said composite by a fluid-cooled press.

15. The process for producing a high strength, dimensionally stable gasketing material including the steps of:
 a. forming a layered composite including a pair of outer layers of aluminum foil and a plurality of alternating inner layers of perforated stainless steel and polytetrafluoroethylene/filler material, said inner layers being arranged so that a polytetrafluoroethylene/filler layer is adjacent to each outer layer and to each stainless steel layer;
 b. pressure sintering said composite by
   (i) preheating said composite for 10–15 seconds at about 100 psi;
   (ii) rapidly reducing the pressure on said composite from about 100 psi to 0 psi;
   (iii) rapidly repeating the pressure cycle of steps (i) and (ii) 3–5 times;
   (iv) quickly increasing the pressure on said composite to about 600 psi; and
   (v) maintaining said composite under a pressure of about 600 psi for a time sufficient to completely change said polytetrafluoroethylene to a gel and to cause said gel to extrude through the perforations in said stainless steel layers to bond to said stainless steel layers and to completely encapsulate said stainless steel layers; and
 c. rapidly cooling the pressure sintered composite under pressure for a time sufficient to cool said composite.

16. The process of claim 15, wherein said intermediate layers are formed from a blend selected from the group consisting of polytetrafluoroethylene and silica, polytetrafluoroethylene and barytes and polytetrafluoroethylene and glass microballoons.

17. The process of claim 15, wherein step c comprises applying a pressure of about 600 psi to said composite by a water-cooled press.

18. A gasketing material formed according to the process described in claim 1.

19. A gasketing material formed according to the process described in claim 12.

20. A gasketing material formed according to the process described in claim 15.

* * * * *